United States Patent
Watson, III et al.

(10) Patent No.: US 6,504,733 B1
(45) Date of Patent: Jan. 7, 2003

(54) SWITCH MODE POWER SUPPLY

(75) Inventors: Robert Goah Watson, III, Noblesville, IN (US); William Vincent Fitzgerald, Zionsville, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/794,550

(22) Filed: Feb. 27, 2001

(51) Int. Cl.[7] .............................................. H02M 3/335
(52) U.S. Cl. ........................................... 363/19; 363/97
(58) Field of Search ............................. 363/18, 19, 16, 363/95, 97, 131

(56) References Cited

U.S. PATENT DOCUMENTS

| | | | |
|---|---|---|---|
| 4,037,271 A | 7/1977 | Keller | 363/21 |
| 4,276,586 A | 6/1981 | Boekhorst | 363/21 |
| 4,438,485 A | 3/1984 | Voigt | 363/21 |
| 5,180,964 A | 1/1993 | Ewing | 323/222 |
| 5,831,838 A * | 11/1998 | Illingworth | 363/21 |
| 5,835,361 A | 11/1998 | Fitzgerald | 363/21 |
| 5,841,642 A | 11/1998 | Fitzgerald | 363/21 |
| 5,877,946 A | 3/1999 | Fitzgerald | 363/21 |
| 6,069,803 A * | 5/2000 | Cross | 363/21 |
| 6,088,250 A * | 7/2000 | Siri | 363/97 |
| 6,262,897 B1 * | 7/2001 | Yasumura | 363/21.02 |

OTHER PUBLICATIONS

Ser. No. 09/468,667 Filed: Dec. 21, 1999 W.V. Fitzgerald, Jr. Overload Protection for a Switch Mode Power Supply (RCA 89356).

Ser. No. 09/419,387 Filed: Oct. 15, 1999 R.E. Fernsler High–Voltage Power Supply Disabling Circuit for Video Display (RCA 89798).

* cited by examiner

*Primary Examiner*—Adolf Deneke Berhane
(74) *Attorney, Agent, or Firm*—Joseph S. Tripoli; Harvey D. Fried; Sammy S. Henig

(57) ABSTRACT

When a main switching transistor of a zero voltage switching power supply is conductive, a voltage is developed in a current sensing resistor coupled in series with the transistor. The voltage in the current sensing resistor is coupled to a control terminal of a comparator transistor. During a given conduction interval of the main switching transistor, the comparator transistor is turned on when the current sensing resistor voltage is sufficiently large to turn on the comparator transistor. An output of the comparator transistor is coupled to the control terminal of the main switching transistor for controlling the turn off instant of the main switching transistor on a current pulse-by-current pulse basis. A resonant voltage pulse developed at a main current conducting terminal of the main switching transistor is capacitively coupled to the control terminal of the comparator transistor for maintaining the comparator transistor turned on, during a transition interval of the resonant voltage pulse.

5 Claims, 2 Drawing Sheets

SWITCH MODE POWER SUPPLY

BACKGROUND

Typically, a switch mode power supply includes a main switching transistor coupled to a primary winding of a main power transformer. Output supply voltages are developed from voltages developed in secondary windings of the transformer. When the transistor is conductive, a current pulse is developed in the primary winding of the transformer and in the main switching transistor. A voltage is also developed in a current sensing resistor coupled in series with the main switching transistor. The voltage developed in the current sensing resistor is coupled to a comparator transistor. During a given conduction interval of the transistor, a latch that includes the comparator transistor is triggered when the current sensing resistor voltage exceeds a threshold voltage of the comparator transistor. An output of the latch is coupled to the control electrode of the transistor for controlling the turn off instant of the transistor on a current pulse-by-current pulse basis.

In one prior art zero voltage switching (ZVS) power supply, a resonant voltage pulse is produced when the transistor is turned off. The latch maintains the transistor turned off, during a portion of the resonant voltage pulse that follows the instant when the main switching transistor turns off. At the end of a trailing edge of the resonant voltage pulse, when the voltage across the transistor is at or close to zero volts, the transistor is turned on again to provide ZVS power supply. It may be desirable to sustain the main switching transistor in the turned off state, during the aforementioned portion of the resonant voltage, without using a latch for simplifying the circuitry.

SUMMARY

A switch mode power supply, embodying an inventive feature includes a source of an input supply voltage and a supply inductance coupled to the input supply voltage source. A capacitance is coupled to the supply inductance to form a tuned, resonstant circuit. A first switching transistor is responsive to a first control signal for generating in a given peroid a pulse in the suppy inductance that is coupled to a load and for generating a resonant pulse in the capacitance. The first control signal turns on the first switching transistor at an end of the resonant pulse for providing zero voltage switching and to turn off the first switching transistor in the given period. The first control signal is generated in accordance with a capacitive current in the capacitance, during the resonant pulse, for maintaining the first switching transistor turned off during a portion of the resonant pulse.

IN THE FIGURES

Figure 1:
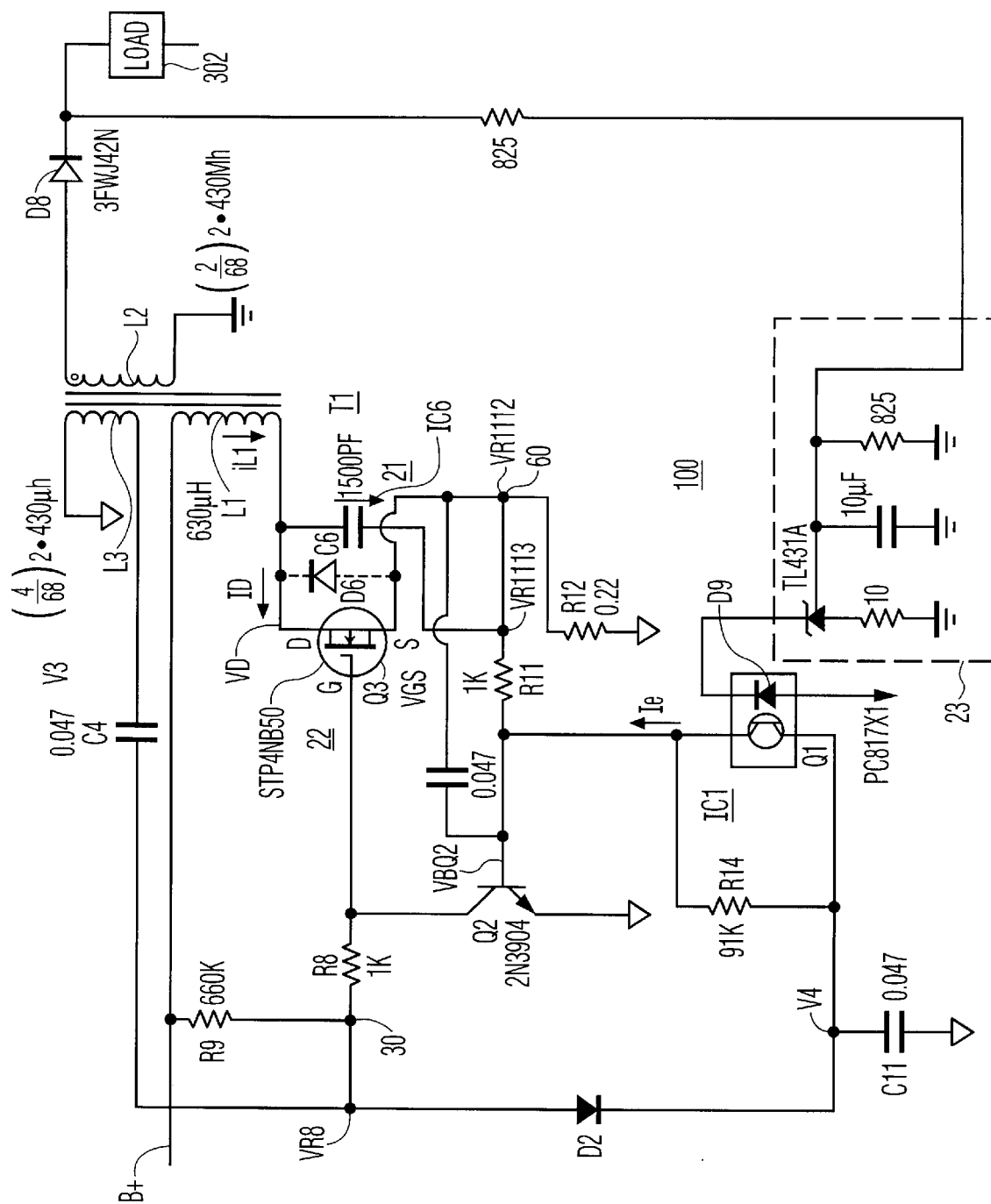

FIG. 1 illustrates a schematic diagram showing an exemplary embodiment of the circuit of the invention; and FIGS. 2a–2f illustrate waveforms useful for explaining the operation of the circuit of FIG. 1

DETAILED DESCRIPTION

FIG. 1 illustrates a tuned SMPS 100, embodying aspects of the invention. In FIG. 1, an N-type, metal oxide semiconductor (MOS) main switching power transistor Q3 has a drain electrode coupled through a primary winding L1 of a transformer T1 to a terminal 20 of an input supply, direct current (DC) voltage RAW B+.

A source electrode of transistor Q3 is coupled to a ground potential via a current sensor or sampling resistor R12. A damper diode D6 formed integrally with transistor Q3 and operating as a switch is effectively coupled in parallel with transistor Q3 to form a bidirectional switch 22. A resonant capacitor C6 is coupled to winding L1 to form, with an inductance of winding L1, a resonant circuit 21 when switch 22 is non-conductive.

A secondary winding L2 of transformer T1 is coupled to an anode of a peak rectifying diode D8 for generating an output voltage VOUT in a filter capacitor C10 that is coupled to a cathode of diode D8. Voltage VOUT is coupled to a load circuit 302. An error amplifier 23 is responsive to voltage VOUT and to a reference voltage, not shown, for controlling a current Ie in a photo transistor Q1 of photo-coupler IC1 that includes a light emitting diode D9. An emitter electrode of transistor Q1 is coupled to the base of a switching transistor Q2 that controls the turn off of transistor Q3. A collector voltage V4 of transistor Q1 is developed in a filter capacitor C11. Emitter current Ie of opto-coupler IC1 is indicative of a difference between voltage VOUT and a reference voltage, not shown, of error amplifier 23. Thus, current Ie produces a controlling bias voltage at the base of transistor Q2.

FIGS. 2a–2f illustrate waveforms useful for explaining the operation of the circuit of FIG. 1. Similar symbols and numerals in FIGS. 2a–2f and 1 indicate similar items or functions.

Transistor Q2 of FIG. 1 has its base electrode coupled via a resistor R11 to a junction terminal 60 between the source electrode of transistor Q3 and current sensor resistor R12. Transistor Q2 is turned on at a time t0 of FIG. 2a when a ramping up source-drain current ID in transistor Q3 of FIG. 1 produces a sufficiently large voltage at terminal 60 to exceed the base-emitter forward voltage of transistor Q2. Transistor Q3 is turned off when transistor Q2 becomes conductive. A resistor R14 is coupled between the emitter and collector of transistor Q1 for biasing the base-emitter of transistor Q2. The level of current ID required to turn on transistor Q2 in a given cycle is controllable by current Ie in a negative feedback manner.

Figure 2A:
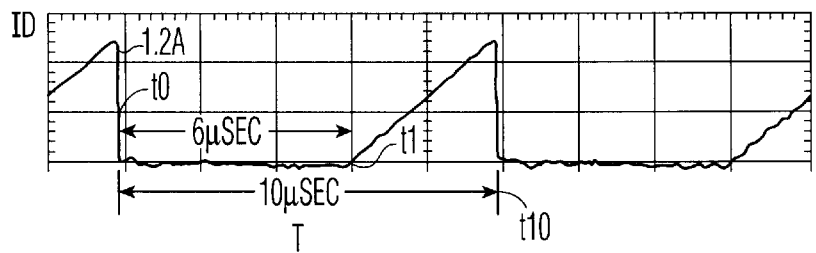
Figure 2B:
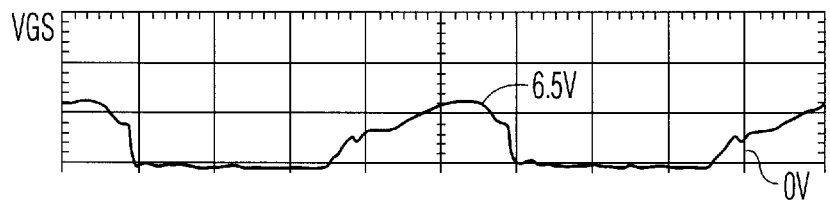
Figure 2C:
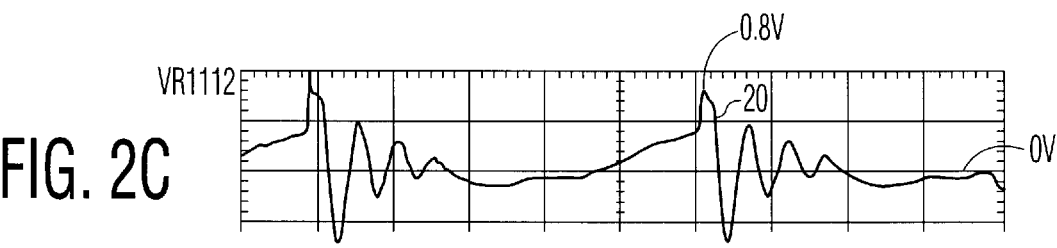
Figure 2D:
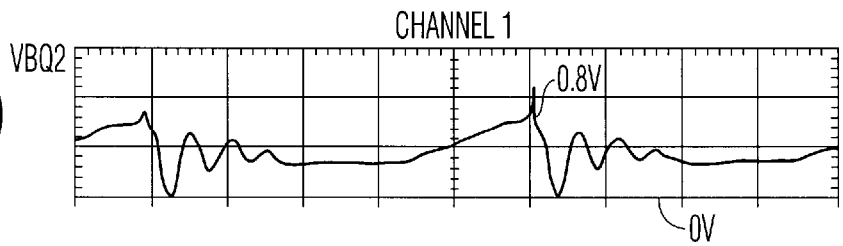
Figure 2E:
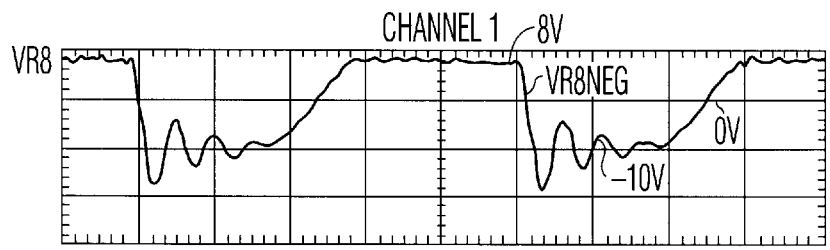

A secondary winding L3 of transformer T1 produces a voltage V3 that is AC-coupled via a capacitor C4 to a resistor R8 to produce a voltage VR8 of FIG. 2e. Voltage VR8 is coupled to the base of transistor Q3 of FIG. 1 to generate a positive gate-source voltage VGS. Positive drive voltage VGS turns on transistor Q3 in a manner to provide a zero voltage switching (ZVS) power supply. The advantages of a ZVS power supply are described in U.S. Pat. No. 5,877,946, issued Mar. 2, 1999, entitled A FORWARD CONVERTER WITH AN INDUCTOR COUPLED TO A TRANSFORMER WINDING, in the name of W. V. Fitzgerald (the Fitzgerald patent). Voltage VGS maintains transistor Q3 turned on until transistor Q2 is turned on. AC-coupled voltage V3 is also rectified by a diode D2 to generate supply voltage V4 for producing current Ie.

A resistor R9, coupled between the source of voltage RAW B+ and a terminal 30 of resistor R8, produces a voltage that turns on transistor Q3, when voltage RAW B+ is turned on, thus providing start up. When voltage VGS on the gate electrode of transistor Q3 exceeds a threshold voltage of MOS transistor Q3, transistor Q3 conducts, causing a drain voltage VD of transistor Q3 to decrease. As a result, voltage V3 becomes positive and reinforces voltage VGS for maintaining transistor Q3 fully turned on in a positive feedback manner.

During an interval t1–t10 of a given period T of FIG. 2a, current ID of conductive transistor Q3 of FIG. 1 is up-ramping. Consequently, a corresponding non-resonant current pulse portion of a current IL1 in winding L1 is up-ramping and stores magnetic energy in the inductance associated with winding L1 of transformer T1. At time t10 of FIG. 2a, a base voltage VBQ2 of FIG. 2d of transistor Q2 of FIG. 1, containing an up-ramping portion derived from the voltage across resistor R12, exceeds the forward voltage of transistor Q2 and turns on transistor Q2. Consequently, gate electrode voltage VGS of FIG. 2b is reduced to near zero volts and turns off transistor Q3 of FIG. 1, as indicated before.

Figure 2F:
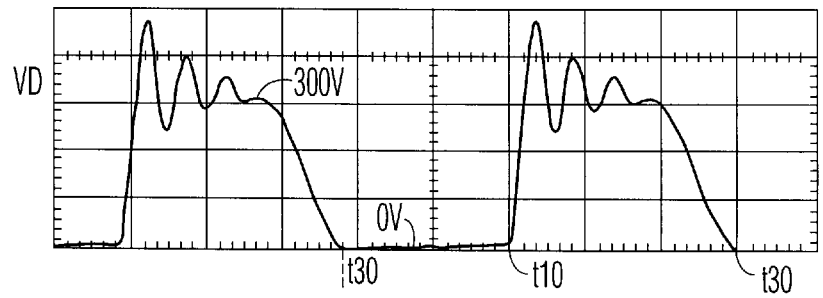

When transistor Q3 is turned off, drain voltage VD of FIG. 2f increases in a resonant manner. Capacitor C6 of FIG. 1 limits the rate of increase of voltage VD such that transistor Q3 becomes completely non conductive before voltage VD increases appreciably above zero voltage.

In an inventive feature, a positive capacitive current iC6 in capacitor C6, that occurs when voltage VD increases, is coupled to resistor R12 for developing a positive voltage pulse 20 of voltage VR1112 of FIG. 2c. Positive voltage pulse 20 is applied via resistor R11 of FIG. 1 to the base of transistor Q2 for maintaining transistor Q2 conductive. As a result immediately afterwards current ID of FIG. 2a becomes zero. After current iC6 of FIG. 1 has decreased to a magnitude that and is unable to maintain transistor Q2 conductive, decreasing voltage V3 produces a negative portion VR8NEG of voltage VR8 of FIG. 2e that maintains transistor Q3 of FIG. 1 turned off.

Resonant circuit 21 that includes capacitor C6 and winding L1 undergoes a half cycle of oscillation, during interval t10–t30 of FIG. 2f, when transistor Q3 of FIG. 1 is turned off. The decrease in voltage VD prior to time t40 of FIG. 2f, causes voltage VGS of FIG. 2b to become positive.

At time t30 of FIG. 2f, voltage VD reverses polarity, causing damper diode D6 of FIG. 1 to turn on for clamping voltage VD of FIG. 2f to approximately zero volts. Thus, resonant circuit 21 of FIG. 1 exhibits a half cycle of oscillation. After time t30 of FIG. 2b, voltage VGS of FIG. 2b becomes increasingly more positive, because of the aforementioned change in polarity of voltage V3 of FIG. 1.

Negative feedback regulation of voltage VOUT is achieved by varying current Ie. When Voltage VOUT is larger than the reference voltage, not shown, of amplifier 23, current Ie increases voltage VBQ2. Consequently, the peak value of current ID in transistor Q3 and the power delivered to load circuit 302 are reduced. On the other hand, when voltage VOUT is smaller than the reference voltage, not shown, of amplifier 23, current Ie is decreases. Consequently, the peak value of current ID in transistor Q3 and the power delivered to the load circuit, not shown, are increased. Thus, the control circuit of transistor Q3 provides duty cycle modulation of current ID in transistor Q3, in accordance with voltage VBQ2.

Tuned SMPS 100 operates in a current mode control, on a current-pulse by current-pulse control basis. The current pulse of current ID during interval t1–t10 of FIG. 2a, flowing in transistor Q3 of FIG. 1, terminates at time t10 of FIG. 2a when the threshold level of transistor Q3 of FIG. 1 is reached, as explained before.

If a fault condition situation occurs, for example when transistor Q1 is disconnected, the current in resistor R14 will maintain base voltage VBQ2 at a predetermined positive voltage bias. Consequently, the peak value of current ID in transistor Q3 and the power delivered to load circuit 302 would be limited. Thereby, advantageously, protection is provided.

What is claimed is:

1. A switch mode power supply, comprising:

a source of an input supply voltage;

a supply inductance coupled to said input supply voltage source;

a capacitance coupled to said supply inductance to form a tuned, resonant circuit;

a first switching transistor for generating pulses in said supply inductance that are coupled to a load such that in a given switching period a resonant current pulse is generated in said capacitance; and means for controlling said first switching transistor to provide zero voltage switching including a current sensor responsive to said resonant current in said capacitance for applying said resonant current to said first switching transistor to maintain said first switching transistor turned off during a portion of said resonant current pulse.

2. A power supply according to claim 1, wherein said current sensor comprises a resistor coupled in series with said capacitance and a second switching transistor coupled to a control terminal of said first switching transistor and responsive to a voltage developed in said resistor for maintaining said first switching transistor turned off, during said resonant pulse portion.

3. A power supply according to claim 2, wherein said second switching transistor operates in a non-latched manner.

4. A power supply according to claim 1, wherein said controlling means is responsive to a signal indicative of a current in said first switching transistor for controlling said first switching transistor in a current mode control operation.

5. A switch mode power supply, comprising:

a source of an input supply voltage;

a supply inductance coupled to said input supply voltage source;

a capacitance having a first terminal coupled to said supply inductance to form a tuned, resonant circuit;

a first switching transistor operating in a zero voltage switching mode for generating in a given period a pulse in said supply inductance that is coupled to a load and for generating a resonant current pulse in said capacitance; and a current sensor responsive to said resonant current pulse for generating a control signal that maintains said first switching transistor turned off during a portion of said given period.

\* \* \* \* \*